United States Patent [19]
Jalics et al.

[11] Patent Number: 5,708,053
[45] Date of Patent: Jan. 13, 1998

[54] SILICA-FILLED RUBBER COMPOSITIONS AND THE PROCESSING THEREOF

[75] Inventors: George Jalics, Akron; Adel Farhan Halasa, Bath; David John Zanzig, Uniontown, all of Ohio

[73] Assignee: The Goodyear Tire & Rubber Company, Akron, Ohio

[21] Appl. No.: 698,532

[22] Filed: Aug. 15, 1996

[51] Int. Cl.$^6$ .................... C08K 9/06; C08K 3/36
[52] U.S. Cl. .............. 523/200; 523/213; 524/493; 524/494; 152/209 R
[58] Field of Search .................. 524/494, 493, 524/263, 261; 525/236, 237; 152/209 R

[56] References Cited

U.S. PATENT DOCUMENTS

| | | | |
|---|---|---|---|
| 4,820,751 | 4/1989 | Takeshita et al. | 523/215 |
| 5,159,009 | 10/1992 | Wolff et al. | 524/495 |
| 5,409,469 | 4/1995 | Hamada | 524/493 |
| 5,496,883 | 3/1996 | Hamada | 524/492 |

FOREIGN PATENT DOCUMENTS 0643098  8/1994  European Pat. Off. .......... C08L 9/00

*Primary Examiner*—George F. Lesmes
*Assistant Examiner*—Olga Asinovsky
*Attorney, Agent, or Firm*—Bruce J. Hendricks

[57] ABSTRACT

The present invention relates to silica-filled rubber compositions and their method of processing. The rubber compositions contain a mixture of 10 to 150 phr of a particulate precipitated silica having dispersed thereon, from 1 to 20 percent by weight based upon the weight of the silica, of a silane-modified elastomer.

15 Claims, No Drawings

SILICA-FILLED RUBBER COMPOSITIONS AND THE PROCESSING THEREOF

BACKGROUND OF THE INVENTION

U.S. Pat. Nos. 3,842,111, 3,873,489 and 3,978,103 disclose the preparation of various sulfur-containing organosilicon compounds.

Sulfur-containing organosilicon compounds are useful as reactive coupling agents between rubber and silica fillers providing for improved physical properties. They are also useful as adhesion primers for glass, metals and other substrates.

U.S. Pat. No. 5,409,969 relates to a tread rubber of a pneumatic tire characterized by 10 to 150 parts by weight of a silica filler and a silane-modified polymer having a glass transition temperature of not lower than −50° C. and obtained by reacting an active terminal of a resulting living polymer through polymerization of 1,3-butadiene or copolymerization of 1,3-butadiene and styrene in an inert organic solvent in the presence of an alkali metal initiator with a silane compound.

SUMMARY OF THE INVENTION

The present invention relates to silica-filled rubber compositions which contain a particulate precipitated silica having dispersed thereon a silane-modified elastomer. The present invention also relates to an efficient method of processing silica-filled rubber compositions.

DETAILED DESCRIPTION OF THE INVENTION

There is disclosed a method of processing a silica-filled rubber composition which comprises mixing
  (i) 100 parts by weight of at least one sulfur-vulcanizable elastomer selected from conjugated diene homopolymers and copolymers and from copolymers of at least one conjugated diene and aromatic vinyl compound; and
  (ii) 10 to 150 phr of a particulate precipitated silica having dispersed thereon from 1 to 20 percent by weight based upon the weight of the silica of a silane-modified elastomer.

There is also disclosed silica-filled rubber composition which comprises a mixture of
  (i) 100 parts by weight of at least one sulfur-vulcanizable elastomer selected from conjugated diene homopolymers and copolymers and from copolymers of at least one conjugated diene and aromatic vinyl compound; and
  (ii) 10 to 150 phr of a particulate precipitated silica having dispersed thereon from 1 to 20 percent by weight based upon the weight of the silica of a silane-modified elastomer.

There is also disclosed a method of reducing the energy required in mixing a silica-filled rubber composition which comprises mixing
  (i) 100 parts by weight of at least one sulfur-vulcanizable elastomer selected from conjugated diene homopolymers and copolymers and from copolymers of at least one conjugated diene and aromatic vinyl compound; and
  (ii) 10 to 150 phr of a particulate precipitated silica having dispersed thereon from 1 to 20 percent by weight based upon the weight of the silica of a silane-modified elastomer.

The present invention may be used to process sulfur-vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect, the rubber composition is comprised of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 55 percent.

The relatively high styrene content of about 30 to about 55 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition should contain a sufficient amount of pretreated silica (a term used herein interchangeably to describe a particulate precipitated silica having dispersed thereon from 1 to 20 percent by weight, based upon the weight of the silica, of the silane-modified elastomer described herein), and nonpretreated silica, if used, to contribute a reasonably high modulus and high resistance to tear. The pretreated silica filler may be added in amounts ranging from 10 to 150 phr. Preferably, the pretreated silica is present in an amount ranging from 15 to 80 phr. If nonpretreated is also present, the amount of nonpretreated silica, if used, may vary. Generally speaking, the amount of nonpretreated silica will vary from 0 to 80 phr. Preferably, the amount of nonpretreated silica will range from 0 to 40 phr.

Where the rubber composition contains both pretreated silica and nonpretreated silica, the weight ratio of pretreated silica to nonpretreated silica may vary. For example, the weight ratio may be as low as 1:5 to a pretreated silica to nonpretreated silica weight ratio of 30:1. Preferably, the weight ratio of pretreated silica to nonpretreated ranges from 1:3 to 5:1. The combined weight of the pretreated silica and nonpretreated silica, as herein referenced, may be as low as about 10 phr, but is preferably from about 45 to about 90 phr.

The commonly employed precipitated siliceous pigments used in rubber compounding applications can be used as the pretreated and nonpretreated silica in this invention. The siliceous pigments preferably employed in this invention are obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

As mentioned above, prior to mixing with an elastomer, precipitated silica is pretreated or has dispersed thereon a silane-modified elastomer. The polymer that is to be dispersed on the surface of the silica is a silane-modified polymer having a glass transition temperature of not lower than −50° C. Generally speaking, the glass transition temperature ranges from about −50° C. to −90° C., with a range of from about −60° C. to −75° C. being preferred.

The silane-modified polymer per se may be prepared in accordance with teaching of U.S. Pat. No. 5,409,969. Therefore, the polymer may be obtained by reacting an active terminal of a resulting living polymer through polymerization of 1,3-butadiene or copolymerization of 1,3-butadiene and styrene with an organic alkali metal initiator with a silane compound represented by the following general formula:

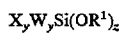

$$X_y W_y Si(OR^1)_z \qquad \text{I}$$

wherein X is a halogen selected from the group consisting of chlorine, bromine and iodine; W is an alkylene radical having from 1 to 8 carbon atoms; y is 0 or 1; $R^1$ is independently selected from the group consisting of alkyl radicals having from 1 to 8 carbon atoms and aryl radicals having from 6 to 24 carbon atoms; and z is 4 when y is 0 and z is 3 when y is 1. Preferably, y is 0, $R^1$ is an alkylene group having 2 carbon atoms and z is 4.

The polymer used in the invention can be produced by the well-known method using an organic alkali metal initiator. The production of such a polymer is usually carried out in an inert organic solvent. As the inert organic solvent, use may be made of pentane, hexane, cyclohexane, heptane, benzene, xylene, toluene, tetrahydrofuran, diethyl ether and the like.

At first, the polymerization of 1,3-butadiene or copolymerization of 1,3-butadiene and styrene is carried out in the presence of an organic alkali metal initiator. As the organic alkali metal initiator, examples include alkyllithiums such as nobutyllithium, sec-butyllithium, t-butyllithium, 1,4-dilithium butane, reaction product of butyllithium and divinylbenzene and the like; alkylene dilithium, phenyl lithium, stilbene dilithium, diisopropenylbenzene dilithium, sodium naphthalene, lithium naphthalene, etc.

In case of the copolymerization, a Lewis base may be used as a randomizing agent and a regulating agent for microstructure of butadiene unit in the copolymer, if necessary. Examples of the Lewis base include ethers and tertiary amines such as dimethoxybenzene, tetrahydrofuran, dimethoxy ethane, diethylene glycol dibutyl ether, diethylene glycol dimethyl ether, triethylamine, pyridine, N-methyl morpholine, N,N,N',N'-tetramethyl ethylenediamine, 1,2-dipiperidinoethane and the like.

Moreover, the content of bound styrene in the copolymer can be controlled by varying the amount of the styrene monomer in the monomer mixture, while the introduction of styrene single chain in the copolymer; ie, arrangement of styrene chain without sequence of styrene chain unit can be controlled by the use of an organic potassium compound such as potassium dodecylbenzene sulfonate or the like. In addition, the content of 1,2-bond in butadiene unit of the copolymer molecule can be controlled by varying the polymerization temperature.

Furthermore, the living polymer may be produced by charging the monomers; ie, 1,3-butadiene or 1,3-butadiene and styrene, the inert organic solvent, the organic alkali metal initiator and, if necessary, the Lewis base into a reaction vessel purged with nitrogen gas at once, discontinuously or continuously.

The polymerization temperature is usually −120° C. to +150° C., preferably −88° C. to +120° C., and the polymerization time is usually 5 minutes to 24 hours, preferably 10 minutes to 10 hours.

The polymerization temperature may be held at a constant value within the above range or may be raised or be adiabatic. And also, the polymerization reaction may be carried out by batch system or continuous system.

Moreover, the concentration of the monomer in the solvent is usually 5–50 percent by weight, preferably 10–35 percent by weight.

In the formation of the living polymer, it is necessary to prevent the incorporation of a compound exhibiting a deactivation function such as halogen compound, oxygen, water, carbon dioxide gas or the like into the polymerization system as far as possible in order to avoid the deactivation of the organic alkali metal initiator and the resulting living polymer.

Representative examples of the silane of formula I include tetramethoxy silane, tetraethoxy silane, tetrapropoxy silane, tetrabutoxy silane, tetrahexoxy silane, tetraheptoxy silane, tetrabutoxy silane, tetra(2-ethylhexoxy) silane, tetraphenoxy silane, chloropropoxy silane, chloromethylpropoxy silane (name all others of importance).

This silane-modified polymer is obtained by reacting the active terminal of the above living polymer with the silane compound of the formula I. The amount of the silane compound used is not less than 0.7 molecule per one active terminal of the living polymer. Preferably, the amount ranges from 0.7–5.0 and, more particularly, from 0.7–2.0. When the amount of the silane compound used is less than 0.7 molecule per one active terminal of the living polymer, the production of branched polymer becomes larger and the change of the molecular weight distribution is large and hence the control of the molecular weight and the molecular weight distribution is difficult, while when it exceeds 5.0 molecule per one active terminal of the living polymer, the effect of improving the wear resistance and fracture properties is saturated and it becomes unfavorable in view of economical reasons.

In the production of the silane-modified polymer, two-stage addition may be used wherein a small amount of the silane compound is first added to the active terminal of the living polymer to form a polymer having a branched structure and then another silane compound is added to the remaining active terminal.

The reaction between the active terminal of the living polymer and the functional group of the silane compound is carried out by adding the silane compound to the solution in the living polymer system, or by adding the solution of the living polymer to an organic solvent solution containing the silane compound.

The reaction temperature is −120° C. to +150° C., preferably −80° C. to +120 C. and the reaction time is 1 minute to 5 hours, preferably 5 minutes to 2 hours.

After the completion of the reaction, the silane-modified polymer can be obtained by blowing steam into the polymer solution to remove the solvent or adding a poor solvent such as methanol or the like to solidify the resulting silane-modified polymer and then drying through hot rolls or under a reduced pressure. Alternatively, the solvent may directly be removed from the polymer solution under a reduced pressure to obtain a silane-modified polymer.

Although the molecular weight of the silane-modified polymer can be varied over a wide range, the Mooney viscosity (MLi+4, 100° C.) is preferable to be within a range of 10–150. When the Mooney viscosity is less than 10, the wear resistance is poor, while when it exceeds 150, the processability is poor.

The pretreatment of the precipitated silica with the silane-modified polymer is generally conducted in the presence of a suitable solvent. The primary criteria is to use a solvent which does not react with the starting materials or end product. Representative organic solvents include chloroform, dichloromethane, carbon tetrachloride, hexane, heptane, cyclohexane, xylene, benzene, toluene, aliphatic and cycloaliphatic alcohols. Preferably, water is avoided to prevent reaction with the reactable siloxy groups of the silane-modified polymers.

The first step in the pretreatment step is to dissolve the silane-modified polymer in the solvent containing the silica. The silane-modified polymer should be added to an amount ranging from about 2 percent to 30 percent by weight based upon the weight of the untreated silica. Preferably, the amount of silane-modified polymer is added in an amount ranging from 10 to 20 percent by weight.

The reaction should be conducted at a temperature ranging from about 50° C. to about 200° C.

The reaction time may vary. Generally, the reaction time ranges from about 1 to 24 hours.

The final step in the pretreatment procedure is to remove the pretreated silica from the solvent. Such a separation step may be accomplished by well-known means such as filtration, drying the pretreated silica with heat and vacuum and the like.

Upon the completion of the pretreatment step, there is provided a silica having dispersed thereon the above-identified silane-modified elastomer. The silane-modified elastomer is generally present at a level ranging from 1 to 20 percent by weight base upon the weight of the silica. Preferably, the silane-modified elastomer is present at a level ranging from 5 to 15 percent by weight based upon the weight of the silica.

Whereas the pretreated silica contains pendent alkoxysilane moieties, such pretreated silica-filled rubber composition may also contain known symmetrical sulfur-containing organosilicon compounds.

Examples of suitable sulfur-containing organosilicon compounds are of the formula:

$$Z\text{-Alk-}S_n\text{-Alk-}Z \tag{II}$$

in which Z is selected from the group consisting of

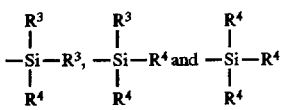 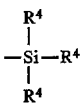

where $R^3$ is an alkyl group of 1 to 4 carbon atoms, cyclohexyl or phenyl;

$R^4$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'bis (trioctoxysilylpropyl) tetrasulfide, 3,3'bis (trihexoxysilylpropyl) disulfide, 3,3'-bis(tri-2''-ethylhexoxysilylpropyl) trisulfide, 3,3'-bis (triisooctoxysilylpropyl) tetrasulfide, 3,3'-bis (tri-t-butoxysilylpropyl) disulfide, 2,2'bis (methoxy diethoxy silyl ethyl) tetrasulfide, 2,2'-bis (tripropoxysilylethyl) pentasulfide, 3,3'-bis (tricyclonexoxysilylpropyl) tetrasulfide, 3,3'-bis (tricyclopentoxysilylpropyl) trisulfide, 2,2'-bis (tri-2''-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-his(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexYlene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis (triethoxysilylpropyl) tetrasulfide. Therefore as to formula II, preferably Z is $$-\underset{\underset{R^4}{|}}{\overset{\overset{R^4}{|}}{Si}}-R^4$$

where $R^4$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of formula II in a rubber composition will vary depending on the level of silica that is used. Generally speaking, the amount of the compound of formula II will range from 0.00 to 1.0 parts by weight per part by weight of the silica. Preferably, the amount will range from 0.00 to 0.4 parts by weight per part by weight of the silica.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts. Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur-vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 2.5, phr. In another embodiment, combinations of a primary and a secondary accelerator might be used, with the secondary accelerator being used in amounts ranging from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, pretreated silica and carbon black, if used, are mixed in one or more non-productive mix stages. The terms "non-productive" and "productive" mix stages are well known to those having skill in the rubber mixing art. The sulfur-vulcanizable rubber composition containing the vulcanizable rubber and generally at least part of the pretreated silica should, as well as any optionable the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

EXAMPLE 1

Preparation of Pretreated Silica

In a meticulously dry 1 gallon (3.79 l) stirred reactor was charged 2,000 grams of a dried butadiene/hexane mixture (15 percent by weight/85 percent by weight) and 3 mmole of n-butyl lithium. The reactor was heated to 60° C. for 4 hours. Two mmoles of tetrathoxysilane (Li/Si=1) was added and the heating continued for another hour. The batch was shortstopped with excess methanol. Six grams of 2,6-di-t-butyl-p-cresol was added to the solution and the polymer isolated by removing the hexane.

Five hundred grams of Zeosil 1165MP silica were charged into a 4-liter beaker along with 306 grams of silated polymer cement (50 grams of dry polymer and 256 grams of hexane). The slurry was stirred followed by removal of the hexane at 70° C. under reduced pressure in a vacuum oven.

The amount of functionalized polymer on the silica was calculated to be 10 weight percent.

EXAMPLE 2

Preparation of Pretreated Silica

In a meticulously dry 1 gallon (3.79 l) stirred reactor was charged 2,000 grams of a dried butadiene/hexane mixture (15 percent by weight/85 percent by weight) and 3 mmole of n-butyl lithium. The reactor was heated to 60° C. for 4 hours. Two mmoles of chloropropyltriethoxysilane (Li/Si=1) was added and the heating continued for another hour. The batch was shortstopped with excess methanol. Six grams of 2,6-di-t-butyl-p-cresol was added to the solution and the polymer isolated by removing the hexane.

Five hundred grams of Zeosil 1165MP silica were charged into a 4-liter beaker along with 306 grams of silated polymer cement (50 grams of dry polymer and 256 grams of hexane). The slurry was stirred followed by removal of the hexane at 70° C. under reduced pressure in a vacuum oven.

The amount of functionalized polymer on the silica was calculated to be 10 weight percent.

EXAMPLE 3

Preparation of Pretreated Silica

In a meticulously dry 1 gallon (3.79 l) stirred reactor was charged 2,000 grams of a dried styrene/butadiene/hexane mixture (1.5 percent by weight/13.5 percent by weight/85 percent by weight) 1.0 mmole of tetraethylethylenediamine and 3 mmole of n-butyl lithium. The reactor was heated to 60° C. for 4 hours. Two mmoles of tetrathoxysilane (Li/Si= 1) was added and the heating continued for another hour. The batch was shortstopped with excess methanol. Six grams of 2,6-di-t-butyl-p-cresol was added to the solution and the polymer isolated by removing the hexane.

Five hundred grams of Zeosil 1165MP silica were charged into a 4-liter beaker along with 306 grams of silated polymer cement (50 grams of dry polymer and 256 grams of hexane). The slurry was stirred followed by removal of the hexane at 70° C. under reduced pressure in a vacuum oven.

EXAMPLE 4

Preparation of Pretreated Silica

In a meticulously dry 1 gallon (3.79 l) stirred reactor was charged 2,000 grams of a dried styrene/butadiene/hexane mixture (3.75 percent by weight/11.25 percent by weight/85 percent by weight) 1.0 mmole of tetraethylethylenediamine and 3 mmole of n-butyl lithium. The reactor was heated to 60° C. for 4 hours. Two mmoles of tetrathoxysilane (Li/Si=

1) was added and the heating continued for another hour. The batch was shortstopped with excess methanol. Six grams of 2,6-di-t-butyl-p-cresol was added to the solution and the polymer isolated by removing the hexane.

Five hundred grams of Zeosil 1165MP silica were charged into a 4-liter beaker along with 306 grams of silated polymer cement (50 grams of dry polymer and 256 grams of hexane). The slurry was stirred followed by removal of the hexane at 70° C. under reduced pressure in a vacuum oven.

EXAMPLE 5

Table I below shows the basic rubber compound that was used in this example. Rubber stocks were prepared in order to compare the effects of using the pretreated particulate precipitated silicas prepared in Examples 1 and 2 versus controls compound not containing such pretreated silicas but separately added modified polymers and silica.

The compounding procedures involved mixing at 60 RPM the nonproductive ingredients until a rubber temperature of 160° C. was achieved, followed by reduction of RPMs to maintain a temperature of 160° C. for a period of time. Total mixing times for the nonproductive stages are shown in Table II. All productive stage mixing was for two minutes. The physical data for each sample is also in Table II.

TABLE I

| Sample | Ctrl 1 | Ctrl 2 | 3 | Ctrl 4 | 5 |
|---|---|---|---|---|---|
| Nonproductive | | | | | |
| Natural Rubber | 25 | 25 | 25 | 10 | |
| IBR[1] | 30 | 30 | 30 | 30 | 30 |
| E-SBR[2] | 61.88 | 61.88 | 61.88 | 61.88 | 61.88 |
| Si69[3] | 11.0 | 11.0 | 11.0 | 11.0 | 11.0 |
| Aromatic Oil | 10.0 | 10.0 | 10.0 | 10.0 | 10.0 |
| Wax | 3.5 | 3.5 | 3.5 | 3.5 | 3.5 |
| Stearic Acid | 2 | 2 | 2 | 2 | 2 |
| Amine Antidegradants | 2 | 2 | 2 | 2 | 2 |
| Silica[4] | 70 | 70 | 0 | 70 | 0 |
| Modified PBD of Example 1[5] | 0 | 7 | 0 | 0 | 0 |
| Silica of Example 1[6] | 0 | 0 | 77 | 0 | 0 |
| Modified PBD of Example 2[7] | 0 | 0 | 0 | 7 | 0 |
| Silica of Example 2[8] | 0 | 0 | 0 | 0 | 77 |
| Productive | | | | | |
| Cyclobenzylsulfenamide | 1.7 | 1.7 | 1.7 | 1.7 | 1.7 |
| Diphenylguanidine | 2.0 | 2.0 | 2.0 | 2.0 | 2.0 |
| Sulfur | 1.4 | 1.4 | 1.4 | 1.4 | 1.4 |
| Zinc Oxide | 3.5 | 3.5 | 3.5 | 3.5 | 3.5 |

[1]Solution polymerized isoprene-butadiene rubber having a Tg of −45° C.
[2]Emulsion polymerized styrene-butadiene rubber having 40 percent by weight bound styrene. Added as 61.88 phr oil extended rubber (45 phr of rubber and 16.88 phr oil).
[3]A composition of bis-(3-triethoxysilylpropyl)tetrasulfide and N330 carbon black (50/50 weight ratio and, thus, considered as being 50 percent active) commercially available as X50S from Degussa Ag.
[4]A silica obtained as Zeosil ™ 1165MP from the Rhone Poulenc Company and, reportably, having a BET surface area of about 165 and a DBP absorption value of about 260–280.
[5]As prepared in Example 1.
[6]As prepared in Example 1.
[7]As prepared in Example 2.
[8]As prepared in Example 2.

TABLE II

| Sample | Ctrl 1 | Ctrl 2 | 3 | Ctrl 4 | 5 |
|---|---|---|---|---|---|
| Silica | 70 | 70 | 0 | 70 | 0 |
| Modified PBD of Example 1 | 0 | 7 | 0 | 0 | 0 |
| Silica of Example 1 | 0 | 0 | 77 | 0 | 0 |
| Modified PBD of Example 2 | 0 | 0 | 0 | 7 | 0 |
| Silica of Example 2 | 0 | 0 | 0 | 0 | 77 |
| Mix Work (MJ/m³) | 2009 | 1681 | 1676 | 1909 | 1703 |
| Stress Strain - 18'/150° C. | | | | | |
| 100% Modulus, (MPa) | 2.08 | 1.95 | 1.98 | 1.89 | 2.01 |
| 300% Modulus, (MPa) | 8.36 | 8.14 | 8.4 | 7.91 | 8.63 |
| M300/M100 | 4.02 | 4.17 | 4.24 | 4.19 | 4.29 |
| Brk Str, (MPa) | 18.67 | 19.26 | 20.38 | 18.56 | 19.15 |
| EL-Brk (%) | 621 | 631 | 648 | 625 | 600 |
| Shore A Hardness | | | | | |
| RT | 66.4 | 63.9 | 64.1 | 63.1 | 63.4 |
| 100° C. | 59.4 | 57.9 | 57.9 | 56.4 | 57.7 |
| Rebound | | | | | |
| RT | 35.9 | 39.3 | 39.8 | 39.3 | 40.2 |
| 100° C. | 60.1 | 61.7 | 61.4 | 59.7 | 52.9 |
| DIN Abrasion, (cc) | 122 | 100 | 105 | 114 | 107 |

Both treated silicas of the present invention (Examples 3 and 5) show reduced work input require during mixing, higher modulus ratio (M300/M100), higher rebound and better (lower) DIN abrasion compared to Control 1. These properties indicate improved energy construction, improved polymer-filler interaction, better tire fuel economy and longer wearing tires. The silica of Example 2 (Sample 5) shows a clear advantage over sample 4 (control) in mixing work required, higher moduli, higher tensile strength, higher rebound and lower DIN abrasion. Lower DIN abrasion values indicate better abrasion resistance which correlate to longer wearing rubber when used as a tread. This indicates it is advantageous to pretreat the silica prior to mixing.

What is claimed is:

1. A method of processing a silica-filled rubber composition which comprises mixing (i) 100 parts by weight of at least one sulfur-vulcanizable elastomer selected from conjugated diene homopolymers and copolymers and from copolymers of at least one conjugated diene and aromatic vinyl compound; and (ii) 10 to 150 phr of a particulate precipitated silica having dispersed thereon from 1 to 20 percent by weight, based upon the weight of the silica, of a silane-modified elastomer, wherein said silane-modified elastomer is obtained by reacting an active terminal of a resulting living polymer through polymerization of 1,3-butadiene or copolymerization of 1,3-butadiene and styrene in an inert organic solvent in the presence of an organic alkali initiator with a silane compound of the formula $$X_y W_y Si(OR^1)_z \qquad \qquad I$$

wherein X is a halogen selected from the group consisting of chlorine, bromine and iodine; W is an alkylene radical having from 1 to 8 carbon atoms; y is 0 or 1; $R^1$ is independently selected from the group consisting of alkyl radicals having from 1 to 8 carbon atoms and aryl radicals having from 6 to 24 carbon atoms; and z is 4 when y is 0 and z is 3 when y is 1.

2. The method of claim 1 wherein said precipitated silica prior to having the silane-modified elastomer dispersed thereon has a BET surface area in the range of from 40 to 600 square meters per gram.

3. The method of claim 1 wherein said precipitated silica prior to having the silane-modified elastomer dispersed thereon has a dibutylphthalate (DBP) absorption value in a range of from 100 to about 400.

4. The method of claim 1 wherein said precipitated silica prior to having the silane-modified elastomer dispersed thereon has an average ultimate particle size in the range of from 0.01 to 0.05 micron.

5. The method of claim 1 wherein said particulate precipitated silica having said silane-modified elastomer dispersed thereon is obtained by reacting said silica in an inert organic solvent in the presence of said silane-modified elastomer.

6. A silica-filled rubber composition which is prepared by a process comprising mixing (i) 100 parts by weight of at least one sulfur-vulcanizable elastomer selected from conjugated diene homopolymers and copolymers and from copolymers of at least one conjugated diene and aromatic vinyl compound; and (ii) 10 to 150 phr of a particulate-precipitated silica having dispersed thereon from 1 to 20 percent by weight, based upon the weight of the silica, of a silane-modified elastomer, wherein said silane-modified elastomer is obtained by reacting an active terminal of a resulting living polymer through polymerization of 1,3-butadiene or copolymerization of 1,3-butadiene and styrene in an inert organic solvent in the presence of an organic alkali initiator with a silane compound of the formula $$X_y W_y Si(OR^1)_z$$

wherein X is a halogen selected from the group consisting of chlorine, bromine and iodine; W is an alkylene radical having from 1 to 8 carbon atoms; y is 0 or 1; $R^1$ is independently selected from the group consisting of alkyl radicals having from 1 to 8 carbon atoms and aryl radicals having from 6 to 24 carbon atoms; and z is 4 when y is 0 and z is 3 when y is 1.

7. The composition of claim 6 wherein said precipitated silica prior to having the silane-modified elastomer dispersed thereon has a BET surface area in the range of from 40 to 600 square meters per gram.

8. The composition of claim 7 wherein said precipitated silica prior to having the silane-modified elastomer dispersed thereon has a dibutylphthalate (DBP) absorption value in a range of from 100 to about 400.

9. The composition of claim 7 wherein said precipitated silica prior to having the silane-modified elastomer dispersed thereon has an average ultimate particle size in the range of from 0.01 to 0.05 micron.

10. The composition of claim 7 wherein $R^1$ is an alkyl radical having four carbon atoms, $R^2$ is hydrogen, $R^3$ is an alkyl radical having one carbon atoms and n is 3.

11. The composition of claim 6 wherein said particulate precipitated silica having said silane-modified elastomer dispersed thereon is obtained by reacting said silica in an inert organic solvent in the presence of said silane-modified elastomer.

12. The composition of claim 6 which is vulcanized.

13. The composition of claim 12 which is in the form of a pneumatic tire, belt or hose.

14. The composition of claim 13 which is in the form of a pneumatic tire.

15. A method of reducing the energy required in mixing a silica-filled rubber composition which comprises mixing (i) 100 parts by weight of at least one sulfur-vulcanizable elastomer selected from conjugated diene homopolymers and copolymers and from copolymers of at least one conjugated diene and aromatic vinyl compound; and (ii) 10 to 150 phr of a particulate precipitated silica having dispersed thereon from 1 to 20 percent by weight, based upon the weight of the silica of a silane-modified elastomer, wherein said silane-modified elastomer is obtained by reacting an active terminal of a resulting living polymer through polymerization of 1,3-butadiene or copolymerization of 1,3-butadiene and styrene in an inert organic solvent in the presence of an organic alkali initiator with a silane compound of the formula $$X_y W_y Si(OR^1)_z$$

wherein X is a halogen selected from the group consisting of chlorine, bromine and iodine; W is an alkylene radical having from 1 to 8 carbon atoms; y is 0 or 1; $R^1$ is independently selected from the group consisting of alkyl radicals having from 1 to 8 carbon atoms and aryl radicals having from 6 to 24 carbon atoms; and z is 4 when y is 0 and z is 3 when y is 1.

* * * * *